US012759820B2

(12) United States Patent
Zhu et al.

(10) Patent No.: US 12,759,820 B2
(45) Date of Patent: Oct. 13, 2026

(54) SYSTEMS FOR BATTERY MANUFACTURE

(71) Applicant: FORD GLOBAL TECHNOLOGIES, LLC, Dearborn, MI (US)

(72) Inventors: Wenhui Zhu, Northville, MI (US); Andrew Robert Drews, Ann Arbor, MI (US); Yongcai Wang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/914,207

(22) Filed: Oct. 13, 2024

(65) Prior Publication Data

US 2026/0103354 A1 Apr. 16, 2026

(51) Int. Cl.

| | |
|---|---|
| ***B65H 3/06*** | (2006.01) |
| ***H01M 10/04*** | (2006.01) |
| ***H01M 10/0585*** | (2010.01) |

(52) U.S. Cl.

CPC ......... *B65H 3/0623* (2013.01); *B65H 3/0638* (2013.01); *B65H 3/0669* (2013.01); *H01M 10/0404* (2013.01); *H01M 10/0585* (2013.01); *B65H 2301/42324* (2013.01); *Y02E 60/10* (2013.01); *Y02P 70/50* (2015.11)

(58) Field of Classification Search

CPC ............ B65H 3/0623; H01M 10/0404; H01M 10/0585

See application file for complete search history.

(56) References Cited

U.S. PATENT DOCUMENTS

| | | | | |
|---|---|---|---|---|
| 4,555,105 A * | 11/1985 | Wyatt | B65H 5/062 | 271/193 |
| 4,699,371 A * | 10/1987 | Ettischer | B65H 1/06 | 271/99 |
| 7,748,701 B2 * | 7/2010 | Gustafsson | B65H 7/12 | 271/152 |
| 9,595,721 B2 | 3/2017 | Hirai et al. | | |
| 12,080,839 B2 * | 9/2024 | Jordan | H01M 10/0585 | |
| 2022/0102747 A1 | 3/2022 | Jordan | | |
| 2024/0120551 A1 | 4/2024 | Kim | | |

FOREIGN PATENT DOCUMENTS

| | | |
|---|---|---|
| CN | 117276625 A | 12/2023 |
| KR | 20150111551 A | 10/2015 |
| KR | 20220169696 A | 12/2022 |
| KR | 20220169706 A | 12/2022 |
| WO | 2014014196 A1 | 1/2014 |

* cited by examiner

*Primary Examiner* — Jeremy R Severson

(74) *Attorney, Agent, or Firm* — David B. Kelley; Brooks Kushman P.C.

(57) ABSTRACT

A system for manufacturing battery cells and methods for utilizing the system are presented. The system includes a feed rotator that contacts an uppermost electrode sheet in a stack of electrode sheets, a fixed stop positioned adjacent to the feed rotator, and a bi-directional drive coupled to the feed rotator and operable to rotate the feed rotator in a first direction to force the uppermost electrode sheet against the fixed stop and immediately thereafter rotate the feed rotator in a second direction opposite to the first direction to feed the uppermost electrode sheet away from the stack.

17 Claims, 6 Drawing Sheets

SYSTEMS FOR BATTERY MANUFACTURE

TECHNICAL FIELD

This disclosure relates to battery manufacturing.

BACKGROUND

The manufacturing of certain pouch-type and prismatic battery cells involves stacking alternating positive and negative electrode sheets to create high-capacity cells before packaging. This process requires handling and transferring of the electrode sheets from a magazine to a cell stack. Vacuum gripper devices may be used to lift individual electrodes from a magazine and place them onto a cell stack. Vacuum conveyors or rotary feed systems may also be used to slide a top electrode from a magazine and move it to an inspection or stacking station.

SUMMARY

A system for manufacturing battery cells includes a feed rotator that contacts an uppermost electrode sheet in a stack of electrode sheets, a fixed stop positioned adjacent to the feed rotator, and a bi-directional drive coupled to the feed rotator and operable to rotate the feed rotator in a first direction to force the uppermost electrode sheet against the fixed stop and immediately thereafter rotate the feed rotator in a second direction opposite to the first direction to feed the uppermost electrode sheet away from the stack. The stack of electrode sheets may be retained in a magazine that provides electrode sheets to the feed rotator. In some configurations, a cylinder may push the stack of electrode sheets and maintain a fixed pressure of the stack against the feed rotator. The bi-directional drive may include stepper motors with linear actuation for control of feed rotator movement. A conveyor may be positioned adjacent to an electrode exit window to receive the uppermost electrode sheet directly from the feed rotator. The feed rotator may be coated with a high friction coefficient material.

A method for manufacturing battery cells includes counter-rotation of a feed rotator in a first direction to force an uppermost electrode sheet in a stack against a fixed stop, forward-rotation of the feed rotator in a second direction opposite to the first direction to feed the uppermost electrode sheet onto a conveyor, and transport of the uppermost electrode sheet to a stacking station using the conveyor. A constant pressure may be maintained on the stack of electrode sheets using a cylinder that pushes the stack toward the feed rotator. Feeding the uppermost electrode sheet onto the conveyor may include guiding the electrode sheet through an electrode exit window in a front wall of an electrode sheet magazine. Rotation of the feed rotator in the first and second directions may be controlled by stepper motors with linear actuation. In some configurations, an angle of the stack of electrode sheets may be adjusted relative to a horizontal plane. The counter-rotation and forward-rotation steps may be performed while the stack of electrode sheets is held at an incline.

A battery cell assembly system may include an electrode sheet magazine that holds a stack of electrode sheets, a feed rotator positioned in contact with an uppermost electrode sheet in the stack, a bi-directional drive coupled to the feed rotator, a conveyor positioned to receive the uppermost electrode sheet from the feed rotator, and a control system that operates the bi-directional drive to separate and feed only the uppermost electrode sheet to the conveyor by a counter-rotation step followed by a forward-rotation step. The electrode sheet magazine may include a back wall and a front wall with an electrode exit window, the feed rotator being positioned adjacent to the electrode exit window. In some configurations, a pressure-maintaining cylinder may push the stack of electrode sheets toward the feed rotator with a constant force. The bi-directional drive may include stepper motors with linear actuation. The electrode sheet magazine may hold the stack of electrode sheets at an adjustable angle relative to the horizontal plane. The conveyor may be positioned to form a continuous path with an electrode exit window of the electrode sheet magazine. The electrode sheets may be compatible for use in lithium-ion battery cells. The electrode sheets may be compatible for use in nickel-metal hydride battery cells, Lithium-ion battery cells with both conventional liquid electrolyte, solid-state Lithium-ion battery cells, as well as sodium-ion battery cells.

DETAILED DESCRIPTION

Figure 1:
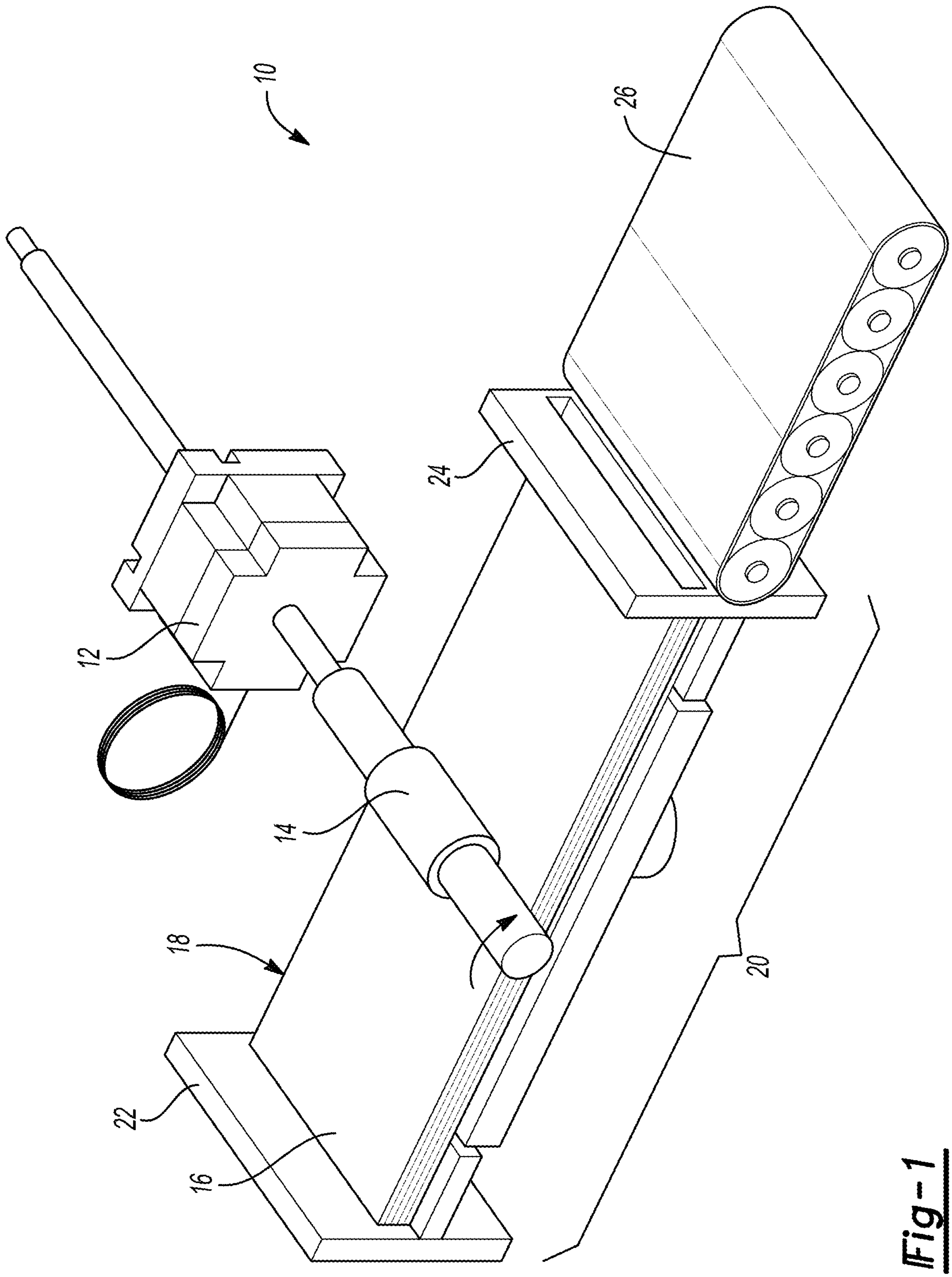
FIGS. 1-4 are schematic diagrams of an electrode sheet feeding system.

In accordance with this disclosure, detailed embodiments of an electrode sheet feeding system, separation methods, and related battery manufacturing processes are provided. These embodiments represent the innovative approach to improving the handling and separation of electrode sheets during the production of battery cells. The figures and descriptions included are illustrative and may not depict every possible variation or configuration of the system. Certain features may be emphasized or simplified to highlight key aspects of the electrode sheet separation process and its mechanical components. Therefore, the specific structural and operational details described are not intended to limit the scope of the invention but to serve as a guide for those skilled in the art to implement various embodiments of the claimed invention.

The present disclosure relates to a design for feeding and separating electrode sheets in battery manufacturing, specifically addressing the ongoing challenge of reliably isolating the uppermost sheet from a stack in a magazine. This is a shared step utilized in the production of both pouch-type and prismatic battery cells. Traditional systems may struggle with either the adhesion of multiple electrode sheets or no sheet picked due to unstable vacuum pressure or contamination-caused poor vacuum, leading to inefficiencies and defected cells of wrong stacking ordering the manufacturing process. The proposed system incorporates a pre-separation step into the conventional rotator or conveyor feed system, increasing the reliability of single-electrode sheet separation. The proposed system utilizes the principles of differential movement and shear force to overcome the sheet adhesion issues seen in existing systems.

A two-step process is integrated into a modified top-feeding rotator system. The process begins with a short counter-rotation step, followed by a forward rotation step, both of which work in tandem with a fixed stop to introduce a slight buckling effect on the electrode sheets. This separation leverages the physical behavior of stacked, flexible electrode sheets when subjected to rotational forces, which helps break the adhesion between the sheets.

The operation of the feeding design begins with the system set up in a manner similar to conventional systems, where a rotator comes into contact with the topmost electrode sheet in a stack of electrodes. Instead of immediately moving the sheet forward, the system first performs a counter-rotation of the rotator. This step forces the uppermost electrode sheet against a fixed stop, causing a slight bending or buckling of the electrode sheet. Due to the physics of differential movement, the top sheet experiences the greatest bending force, while the layers beneath it are subjected to much less.

The process may be mathematically described using the equation:

$$F = mr\alpha$$

Where:

F is a rotary force applied by a rotator, m is the mass of an electrode sheet, r is the distance from a pivot point (the contact point between a rotator and an electrode sheet), α is angular differential movement.

Under the same force F, an uppermost electrode sheet (Sheet 1) is closer to a pivot point, meaning its distance r is shorter compared to a second electrode sheet (Sheet 2). As a result, Sheet 1 undergoes greater differential movement α, allowing it to move faster and further than lower electrode sheets. In addition, as Sheet 1 moves leftward, it exerts a frictional force to the right on Sheet 2, further reducing Sheet 2's total differential movement. The displacement of the rotator is proportional to the differential movement, so Sheet 1 will move more than Sheet 2, ensuring that only the top electrode sheet is separated and fed forward while the others remain in place.

The subsequent forward rotation of the rotator causes Sheet 1 to slide over any remaining electrode sheets, breaking the adhesion at the edges. This controlled motion ensures that only one electrode sheet is transferred to the next stage of the manufacturing process. By introducing a controlled mechanical process that creates differentiated bending and shear forces, this configuration offers a solution to the issue of multiple-electrode sheet adhesion, increasing overall efficiency and accuracy of electrode sheet handling in battery manufacturing.

This design may be applicable across different battery types and chemistries, including lithium-ion, nickel-metal hydride, lithium polymer cells, and sodium-ion battery cells. The ability to handle these various chemistries makes this design highly versatile for use in the production of a wide range of energy storage solutions, from electric vehicles to portable electronics.

FIGS. 1-4 are schematic diagrams of an electrode sheet feeding system 10. The electrode sheet feeding system 10 includes a bi-directional drive 12 coupled with a rotator 14 to make contact with a top electrode sheet 16 in a stack of electrode sheets 18. The bi-directional drive 12 is capable of rotating the rotator 14 both clockwise and counterclockwise, allowing for precise control over the movement and separation of individual electrode sheets. The rotator 14 applies force on the top electrode sheet 16 to maintain consistent contact during the separation process. The rotator 14 may be coated with a high-friction material or layered with an over-grip to increase its grip on the electrode sheets. This electrode sheet feeding system 10 may be configured to handle varying thicknesses and surface textures of electrode sheets, which may differ depending on specific battery chemistry or manufacturing process in use. The electrode sheet feeding system 10 further includes a magazine 20, which holds the stack of electrode sheets 18. The magazine 20 is configured to present the top electrode sheet 16 to the rotator 14 for separation. The magazine includes a fixed stop 22 and a window 24, through which the top electrode sheet 16 is fed.

Figure 2:
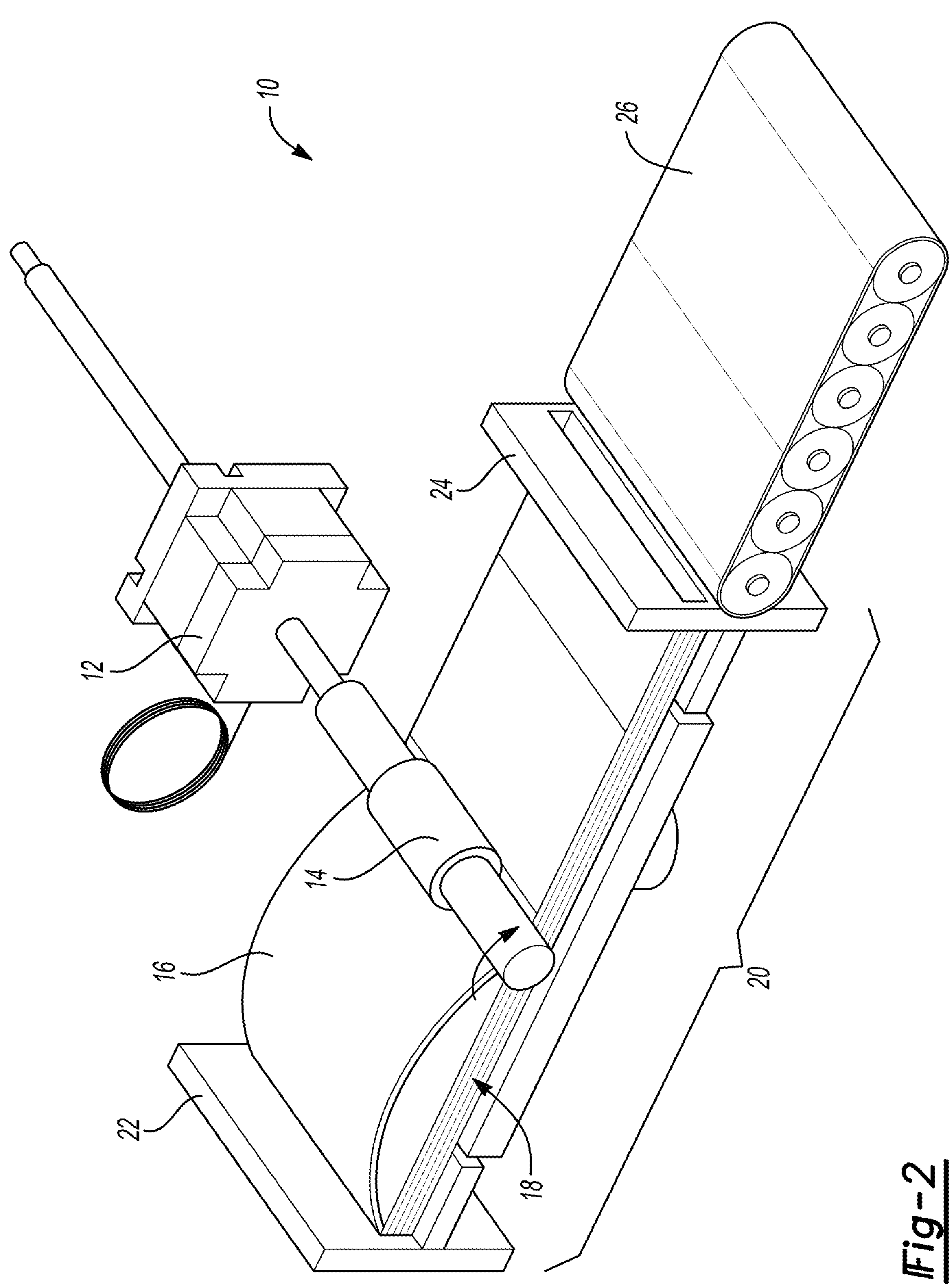

In FIGS. 1-2 the bi-directional drive 12 rotates the rotator 14 in a first direction to translate the top electrode sheet 16 against a fixed stop 22 to separate the top electrode sheet 16 from the stack of electrode sheets 18. This initial rotation induces a slight buckling in the top sheet as it comes into contact with the fixed stop 22, a mechanical component strategically placed to control the movement and prevent multiple sheets from advancing simultaneously. The slight deformation of the top electrode sheet 16 during this step helps to break any adhesion forces, such as static electricity or surface tension, between it and the underlying stack of electrode sheets 18.

Figure 3:
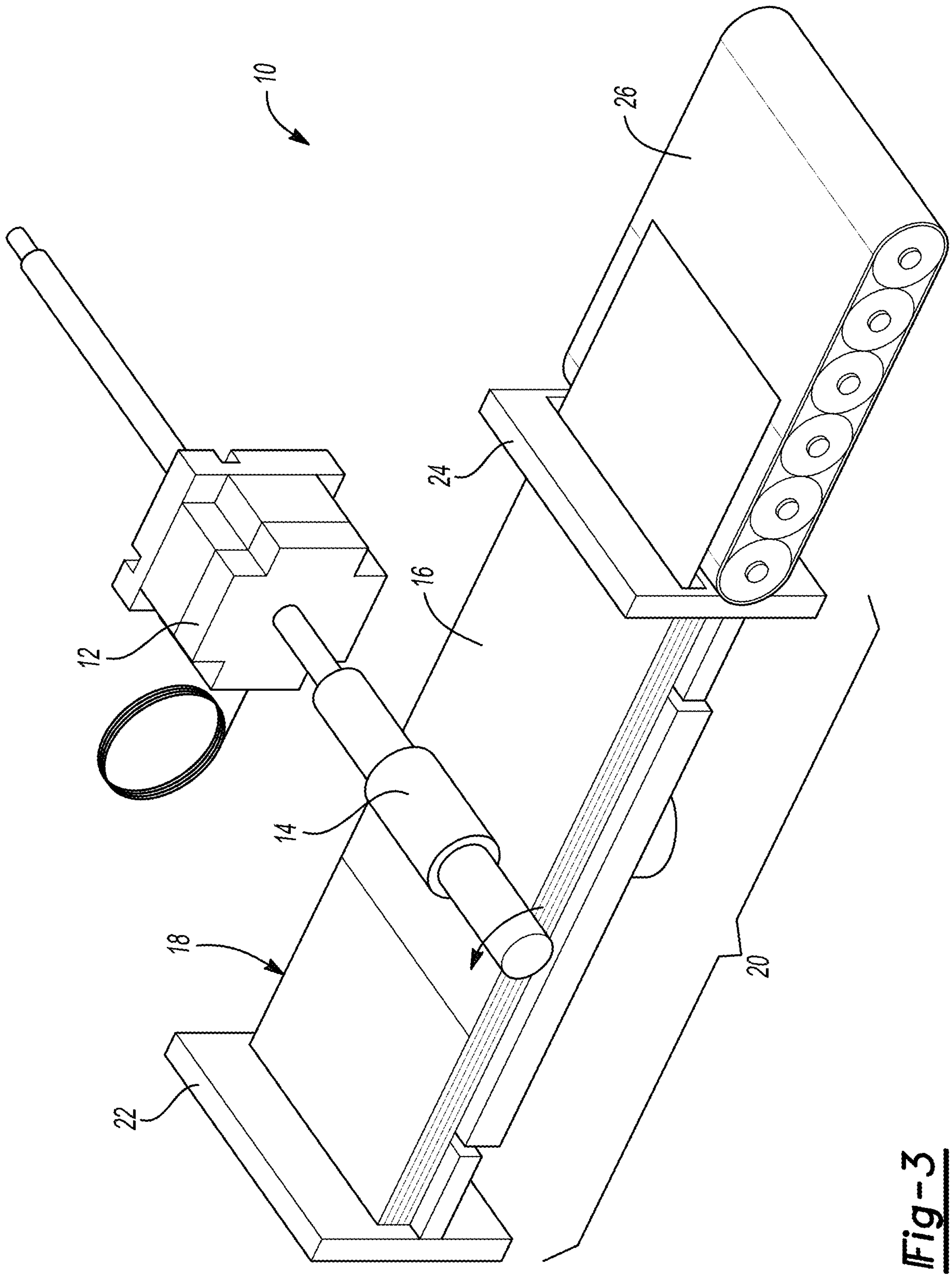

In FIG. 3 after the top electrode sheet 16 is separated, the bi-directional drive 12 rotates the rotator 14 in a second direction opposite to the first direction to translate the top electrode sheet 16 through a window 24 and onto a conveyor 26. The change in direction ensures that the separated top sheet is smoothly and accurately fed through the window 24 without disturbing the remaining stack of electrode sheets 18. The use of a conveyor 26 maintains the continuous transport of electrode sheets to subsequent stages in the manufacturing process, such as inspection or stacking, while minimizing misalignment or degradation to the sheets.

Figure 4:
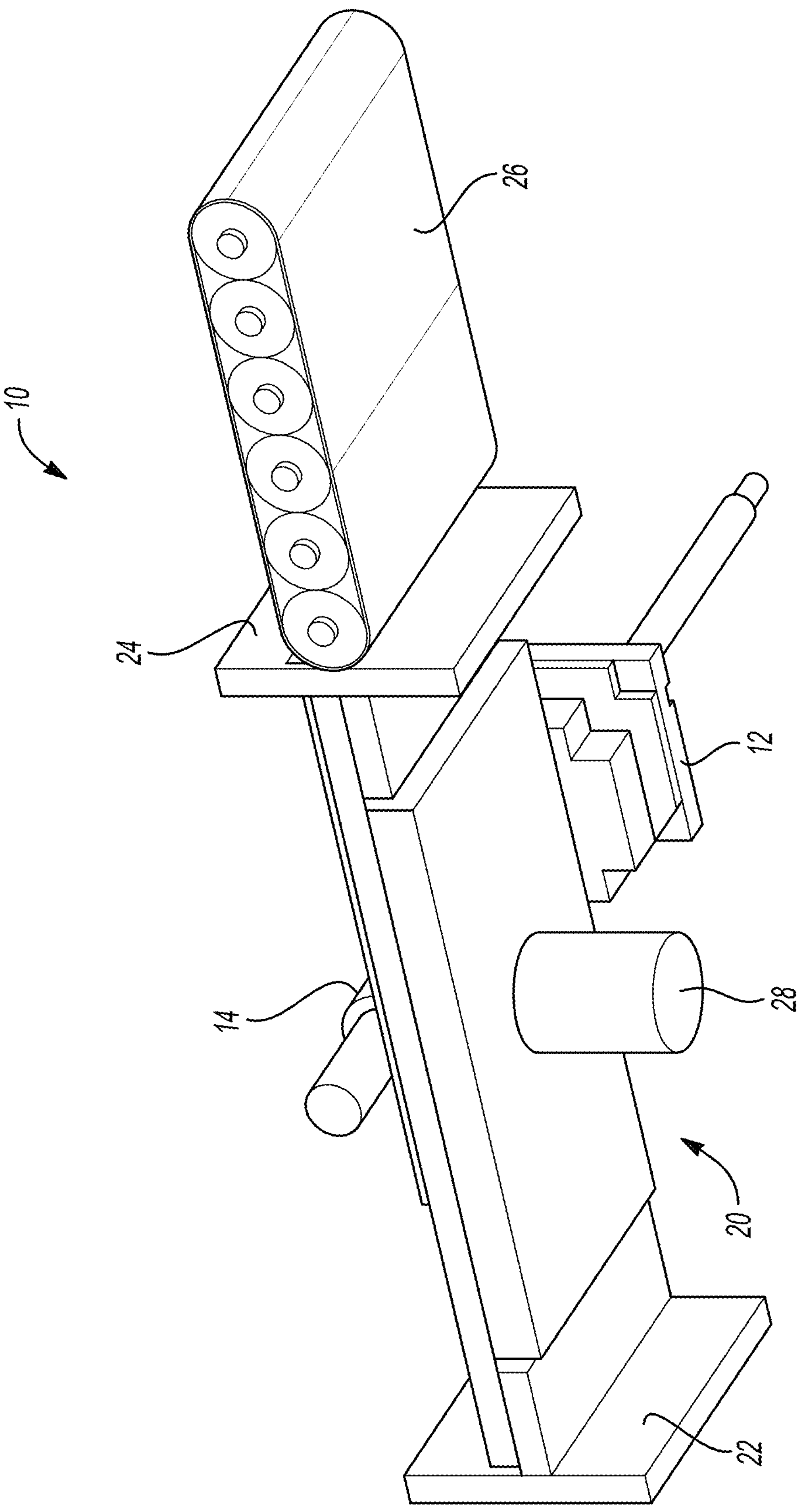

FIG. 4 is a schematic diagram of an underside view of electrode sheet feeding system 10. The electrode sheet feeding system 10 also includes a cylinder 28, which is positioned to push the stack of electrode sheets 18 and maintain a fixed pressure against the rotator 14. The cylinder 28 provides a constant, adjustable force that maintains contact between electrode sheets and the rotator 14 throughout the feeding process. This consistent pressure allows the rotator to separate and transfer the top electrode sheet 16 without requiring manual adjustments or interruptions in the workflow. The use of the cylinder 28 is advantageous in maintaining the smooth, continuous feeding of electrode sheets, compensating for any variations in stack height or sheet thickness that may occur as the stack depletes. By providing uniform pressure across the stack of electrode sheets 18, the electrode sheet feeding system 10 reduces the likelihood of sheet misfeeds or jams.

FIGS. 5-9 are schematic diagrams of an electrode sheet feeding process utilizing the electrode sheet feeding system 10 and the mechanics of separation using the rotator 14 on the stack of electrode sheets 18. These figures show various stages in the operation of the rotator 14 and demonstrate how the top electrode sheet 16 is separated from the rest of the stack of electrode sheets 18.

Figure 5:
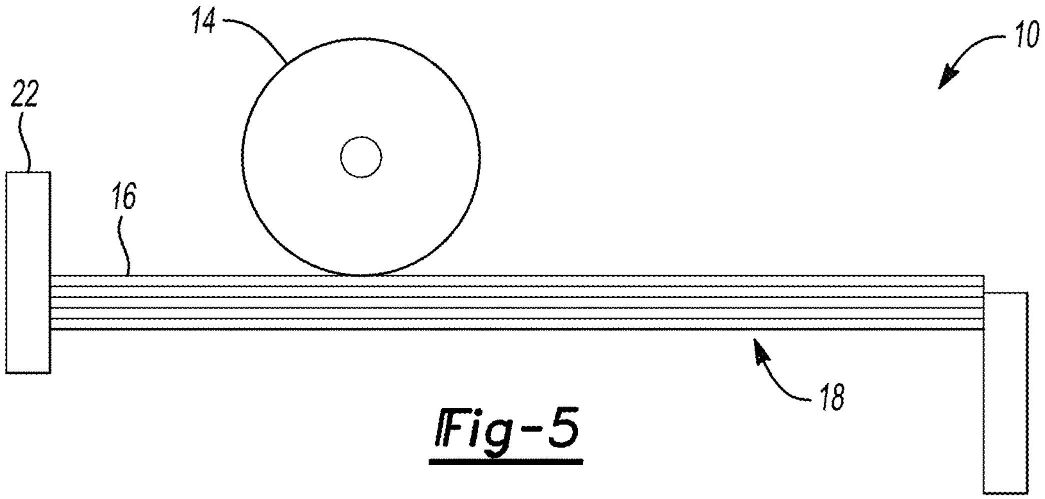
FIGS. 5-9 are schematic diagrams of sequential stages of an electrode sheet separation process, utilizing components of the electrode sheet feeding system shown in FIGS. 1-4.

In FIG. 5, the rotator 14 is positioned in contact with the top electrode sheet 16 while the stack of electrode sheets 18 rests against the fixed stop 22. At this point, no motion has occurred, and the stack of electrode sheets 18 remains flat and aligned. The electrode sheet feeding system 10 is ready to initiate the separation process.

Figure 6:
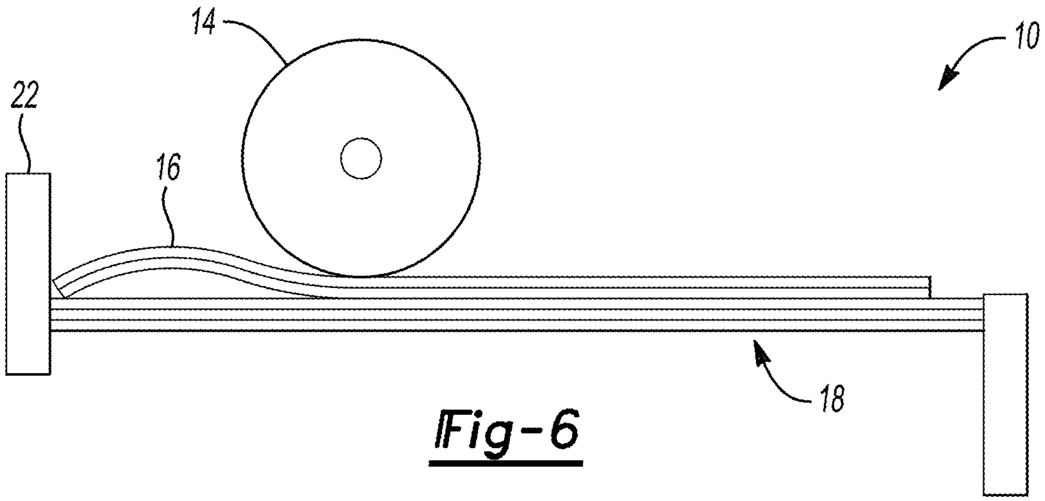

FIG. 6 shows the start of the counter-rotation of the rotator 14, which causes the top electrode sheet 16 to warp and lift slightly as it moves against the fixed stop 22. This buckling creates a separation force between the top electrode sheet 16 and the stack of electrode sheets 18, beginning the process of breaking any adhesion between the layers.

Figure 7:
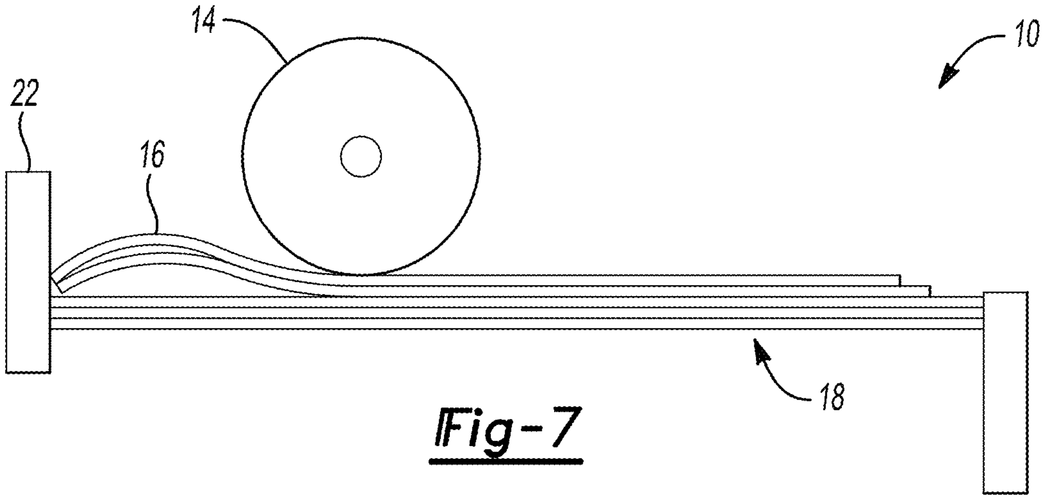

In FIG. 7, the counter-rotation of the rotator 14 continues, further bending the top electrode sheet 16 and increasing the separation between the top electrode sheet 16 and the remaining stack of electrode sheets 18. The increased bending and tension at the edges helps to fully disengage the top electrode sheet 16 from a next sheet in the stack of electrode sheets 18, overcoming any sticking caused by surface tension or burrs.

Figure 8:
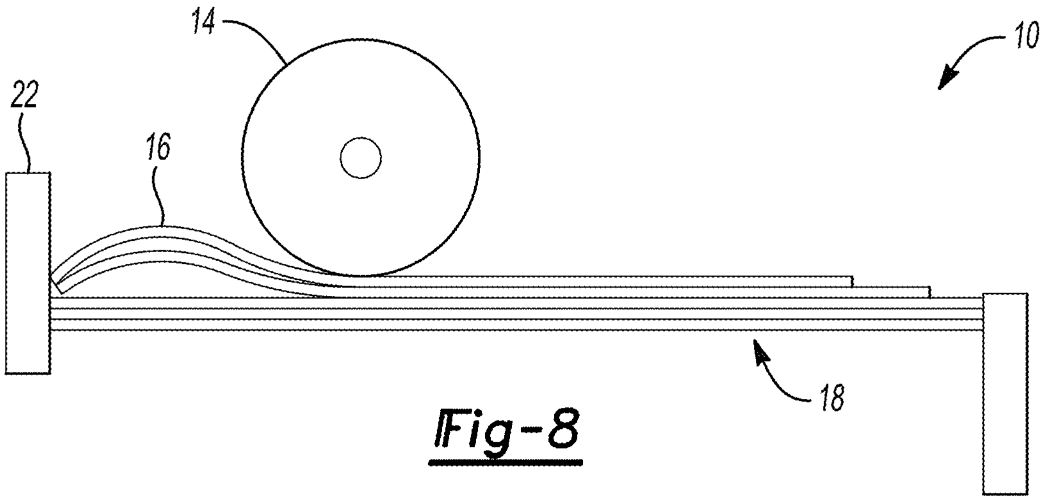

FIG. 8 is the final stage of the counter-rotation of the rotator 14, where the top electrode sheet 16 is now almost fully separated from the rest of the stack of electrode sheets 18. The buckling effect has maximized, so that the top electrode sheet 16 is ready for forward translation without interference from the remaining stack of electrode sheets 18.

Figure 9:
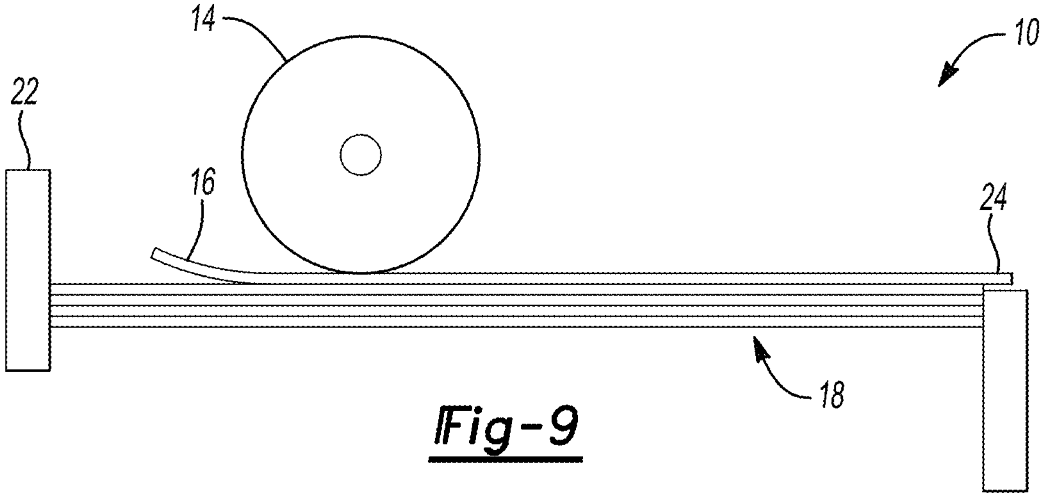

In FIG. 9, the rotator 14 rotates in the opposite direction, initiating the forward motion of the now-separated top electrode sheet 16. The sheet moves through a window 24 and may be placed onto a conveyor for further processing. At this point, the stack of electrode sheets 18 remains in place, ready for the next cycle of separation, and the electrode sheet feeding system 10 is set to repeat the process.

Although specific embodiments of an electrode sheet feeding system, methods for separating individual sheets, and the related manufacturing processes have been described in detail, these embodiments do not encompass all possible configurations. The language used in this specification is intended for illustrative purposes and should not be construed as limiting the scope of the invention. Variations and modifications may be made without departing from the fundamental principles of the invention. Furthermore, the features and elements of the disclosed embodiments may be combined in various ways to create additional embodiments that fall within the scope of the claimed invention, even if such combinations are not explicitly described in this specification.

What is claimed is:

1. A system for manufacturing battery cells comprising:
an electrode sheet magazine configured to hold a stack of electrode sheets for use in forming a battery cell, and defining a fixed stop and an electrode exit window;
a feed rotator configured to contact an uppermost electrode sheet in the stack;
and
a bi-directional drive coupled to the feed rotator and operable to rotate the feed rotator in a first direction to force the uppermost electrode sheet against the fixed stop and immediately thereafter rotate the feed rotator in a second direction opposite to the first direction to feed the uppermost electrode sheet through the electrode exit window and away from the stack for delivery to a downstream battery cell assembly operation.

2. The system of claim 1, further comprising a cylinder configured to push the stack and maintain a fixed pressure of the stack against the feed rotator.

3. The system of claim 1 wherein the bi-directional drive includes stepper motors.

4. The system of claim 1 further comprising a conveyor positioned adjacent to the electrode exit window to receive the uppermost electrode sheet directly from the feed rotator.

5. The system of claim 1 wherein the feed rotator is coated.

6. A method for manufacturing battery cells comprising:
retaining a stack of electrode sheets in an electrode sheet magazine that defines a fixed stop and an electrode exit window;
counter-rotating a feed rotator in a first direction to force an uppermost electrode sheet in the stack against the fixed stop;
forward-rotating the feed rotator in a second direction opposite to the first direction to feed the uppermost electrode sheet through the electrode exit window and onto a conveyor; and
transporting the uppermost electrode sheet to a stacking station using the conveyor to a battery cell stacking station for incorporation into a battery cell.

7. The method of claim 6, further comprising maintaining a constant pressure on the stack using a cylinder that pushes the stack towards the feed rotator.

8. The method of claim 6 wherein rotating the feed rotator in the first and second directions is controlled by stepper motors.

9. The method of claim 6, further comprising adjusting an angle of the stack relative to a horizontal plane.

10. The method of claim 6 wherein the counter-rotating and forward-rotating are performed while the stack is held at an incline.

11. A battery cell assembly system comprising:
an electrode sheet magazine configured to hold a stack of electrode sheets for forming battery cells, and defining a fixed stop and an electrode exit window;
a feed rotator positioned in contact with an uppermost electrode sheet in the stack;
a bi-directional drive coupled to the feed rotator;
a conveyor positioned to receive the uppermost electrode sheet through the electrode exit window and transport the uppermost electrode sheet toward a battery cell stacking station; and
a control system programmed to operate the bi-directional drive to separate and feed only the uppermost electrode sheet to the conveyor by counter rotation of the feed rotator followed by forward rotation of the feed rotator for battery cell assembly.

12. The battery cell assembly system of claim 11, further comprising a pressure-maintaining cylinder configured to push the stack towards the feed rotator with a constant force.

13. The battery cell assembly system of claim 11 wherein the bi-directional drive includes stepper motors.

14. The battery cell assembly system of claim 11 wherein the electrode sheet magazine is configured to hold the stack at an adjustable angle relative to a horizontal plane.

15. The battery cell assembly system of claim 11 wherein the conveyor is positioned to form a continuous path with the electrode exit window.

16. The battery cell assembly system of claim 11 wherein the electrode sheets are compatible for use in lithium-ion battery cells.

17. The battery cell assembly system of claim 11 wherein the electrode sheets are compatible for use in nickel-metal hydride battery cells, sodium ion battery cells, as well as solid-state battery cells.

* * * * *